United States Patent [19]

Beach

[11] 3,756,181
[45] Sept. 4, 1973

[54] TORPEDO SEPARATION SENSING DEVICE

[75] Inventor: Eugene H. Beach, Silver Spring, Md.

[73] Assignee: The United States of America as represented by the Secretary of the Navy, Washington, D.C.

[22] Filed: Mar. 13, 1970

[21] Appl. No.: 20,441

[52] U.S. Cl. .......................... 114/20 R, 102/70.2 R
[51] Int. Cl. .. F42b 19/00, F42b 19/36, F42b 19/10
[58] Field of Search .................... 114/20; 102/70.2 P

[56] References Cited
UNITED STATES PATENTS
3,004,506  10/1961  Cooke et al. .......................... 114/20
3,129,424  4/1964  Rabinow ............................ 102/70.2

Primary Examiner—Benjamin A. Borchelt
Assistant Examiner—Thomas H. Webb
Attorney—R. S. Sciascia and J. A. Cooke

[57] ABSTRACT

A torpedo separation sensing device having a laser for providing optical pulses of energy which are transmitted both within the torpedo and out the torpedo. A first plurality of photodetectors provide a first electrical signal responsive to the optical signals transmitted within the torpedo. A second plurality of photodetectors provide a second electrical signal responsive to the reflection of the transmitted optical light out of the torpedo and reflected back inside the torpedo, for example, off the torpedo tube. Logic circuitry is provided to insure that an output signal occurs only upon occurrence of the first electrical signal and absence of the second electrical signal indicating physical separation of the torpedo and the torpedo tube.

9 Claims, 1 Drawing Figure

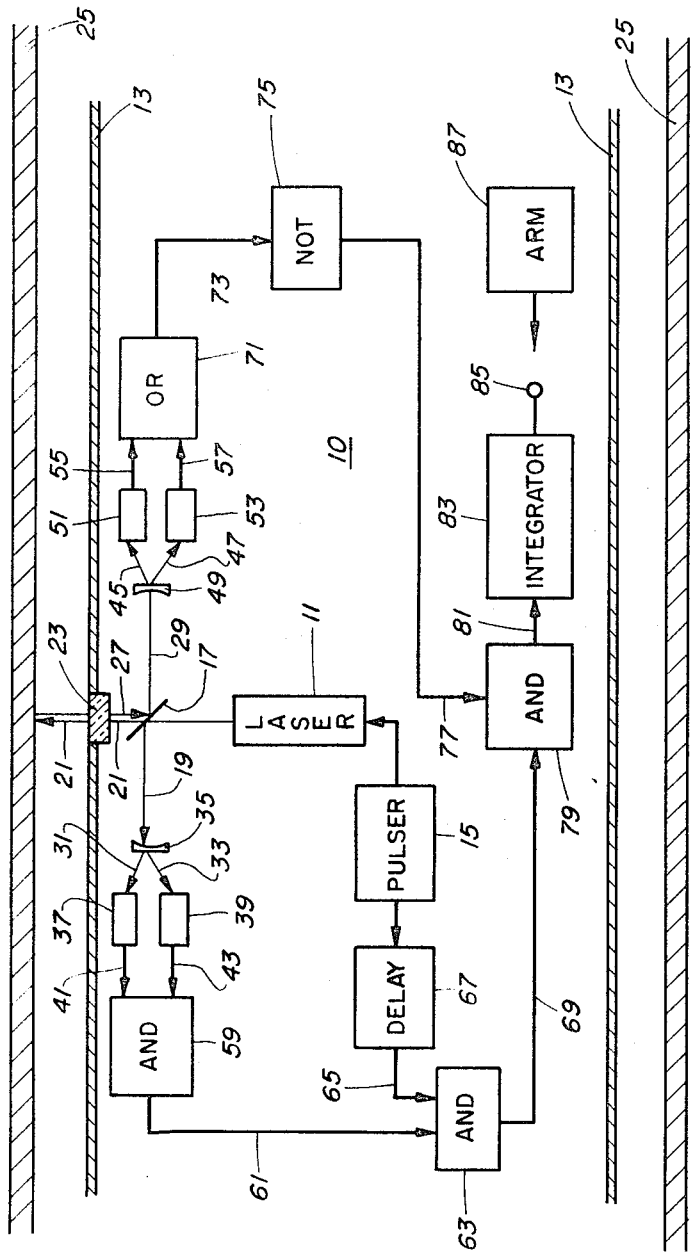

TORPEDO SEPARATION SENSING DEVICE

BACKGROUND OF THE INVENTION

This invention relates generally to separation sensing devices and, more particularly, to a torpedo separation sensing device.

Prior art sensing systems have been devised to insure that an ordnance device has physically cleared its delivery vehicle prior to arming of the ordnance device. Thus, in the case of a torpedo delivered by a submarine, or the like, prior systems have utilized the integration of screw count, detection of water flow past the body shell of the torpedo or have used a lanyard pull switch with the lanyard attached to the torpedo tube to give an indication that the torpedo has cleared the submarine and, therefore, insure that premature arming will not occur while the torpedo is still in the tube. These devices, however, have proven somewhat unsatisfactory in that both the integration of screw count and detection of water flow past the body shell may give a false indication of torpedo clearance when the torpedo is caught in the tube extension. Similarly, the use of a lanyard connected between the torpedo and the torpedo tube is prone to fouling or other reliability problems.

SUMMARY OF THE INVENTION

Accordingly, one object of the invention is to provide an improved ordnance vehicle separation sensing device.

Another object of the present invention is to provide a torpedo separation sensing device immune to spurious signals occurring external to the torpedo.

Yet another object of the instant invention is to provide a torpedo separation sensing device immune to spurious signals occurring within the torpedo.

A still further object of the present invention is to provide a torpedo separation sensing device that is compact and is located inside the torpedo.

Briefly, these and other objects of the present invention are attained by providing a torpedo separation sensing device utilizing a light source, such as a laser, the light of which is transmitted from the torpedo and, depending on receiving a reflected beam off the torpedo tube wall, provides an indication of clearance of the torpedo from the torpedo tube.

BRIEF DESCRIPTION OF THE DRAWING

A more complete understanding of the invention and many of the attendant advantages thereof will be readily appreciated as the same becomes better understood by reference to the following detailed description when considered in connection with the accompanying drawing wherein the sole FIGURE is a block diagrammatic view of the torpedo separation sensing device of the present invention.

DESCRIPTION OF THE PREFERRED EMBODIMENT

Referring now to the sole FIGURE of the drawing, the torpedo separation sensing device 10 is located within the casing 13 of a torpedo and includes a source of light, such as an argon laser 11, which in response to a conventional pulser 15 connected thereto, provides pulses of optical energy, such as blue-green light, for impingement on a half-mirror 17. As hereinafter more fully explained, a portion 19 of the laser light is reflected by the half-miror while another portion 21 of the laser light is passed through the mirror and is further passed through an optical window, such as a lens 23, located in torpedo casing 13, for transmission outside the torpedo. If the torpedo is still within its launching tube 25, the transmitted light 21 will be reflected off the torpedo tube wall and will be received back in the torpedo via optical window or lens 23 as indicated at 27. As hereinafter more fully explained, reflected light 27 impinges on half-mirror 17 and is further reflected, as indicated at 29, to yield a pulse of light which may be detected to indicate that the torpedo has yet to clear the torpedo tube. It will be apparent that if the torpedo has cleared the torpedo tube transmitted light 21 will not be reflected back into the torpedo and, therefore, there will be no light as heretofore available at 29.

The light 19 reflected by half-mirror 17 is separated into two paths or light beams 31 and 33 by a conventional lens 35. The light at 31 and 33 is detected by photodetectors 37 and 39, respectively, such as, for example, gallium arsenide cells or the like, to provide electrical outputs at 41 and 43 responsive, respectively, to the detection of light 31 by photodetector 37 and the detection of light 33 by photodetector 39. Similarly, the light 29 reflected off the torpedo tube 25 and half-mirror 17 is split into two light beams 45 and 47 by a conventional lens 49. The light beams 45 and 47 are detected in photodetector 51 and 53, respectively, to provide electrical outputs at leads 55 and 57 responsive to the light 45 and 47 impinging on the photodetector. By way of example, photodetectors 51 and 53 may be gallium arsenide cells similar to photodetectors 37 and 39. Of course, any device which provides an electrical output responsive to the detection of light may be utilized as the photodetectors.

The electrical output 41 and 43 of photodetectors 37 and 39 are coupled to a conventional AND gate 59 the output 61 of which is connected to an AND gate 63 to provide an input thereto. The other input 65 to AND gate 63 is provided by pulser 15 via a conventional delay network 67 connected therebetween. As hereinafter more fully explained, AND gate 63 operates in conjunction with pulser 15 and delay network 67 to provide an output at lead 69 only upon proper synchronization of laser 11 and detection of light by photodetectors 37 and 39. More particularly, AND gate 63 insures that a signal at lead 61 caused by spurious operation of photodetectors 37 and 39 will not provide an output at lead 69 since only those detections by photodetectors 37 and 39 which provide an output at lead 61 occurring during proper pulsing of laser 15 will given an indication at lead 69. Delay network 67 is included to compensate for the time it takes the light output from laser 11 to transverse the path including reflection by half-mirror 17, lens 35, photodetectors 37 and 39 and AND gate 59.

Photodetectors 51 and 53 are connected via leads 55 and 57 respectively, to a conventional OR gate 71. The output 73 of OR gate 71 is connected to a conventional NOT gate 75 which provides via lead 77 an input to a conventional AND gate 79. The other input to AND gate 79 is provided by lead 69 which, in turn, is responsive to AND gate 63. As hereinafter more fully explained, output pulses occur at a lead 81, the output of AND gate 79, only upon concurrent input to the AND gate provided by leads 69 and 77 and this, in turn, occurs only when the torpedo has cleared the torpedo tube. The pulses at lead 81 may be integrated in a conventional integrator 83 to provide an output signal at a terminal 85. Terminal 85 is connectable, for example, to the arm circuitry 87 of the torpedo to allow arming of the torpedo subsequent to separation of the torpedo from the torpedo tube. Of course, it is readily apparent, that terminal 85 may be connected to any other circuitry which is desired to be responsive to separation of the torpedo and the torpedo tube.

In operation, laser 11 is responsive to the pulses supplied by pulser 15 to provide optical energy bursts or optical energy pulses at the output of the laser. These optical pulses are reflected, in part, by half-mirror 17 and are split up into two beams, 31 and 33, by optical lens 35. The light provided by beams 31 and 33 are detected in photodetectors 37 and 39 to provide electrical outputs at leads 41 and 43, respectively. Upon simultaneous signals at leads 41 and 43, AND gate 59 provides an electrical output at lead 61. Pulser 15 provides an electrical signal at lead 65, delayed by delay network 67 and, therefore, upon coincidence of the electrical signals at lead 61 and 65, AND gate 63 provides an electrical signal at lead 69. As hereinafter more fully explained, delay network 67 and AND gate 63 insure that "spoofing" or the detection of spurious optical signals by photodetectors 37 and 39 will not provide an output at lead 69 without the correct pulse from pulser 15. Thus, spurious detection by photodetectors 37 and 39 out of synchronism with the light provided by a laser 11 will not provide a signal at lead 69. Similarly, AND gate 59 insures that a spurious output at leads 41 or 43, caused by noise or the like in one of the photodetectors, coupled with failure of laser 11 (but not pulser 15) will not provide an incorrect output at lead 69 since both detectors must be noise triggered before a signal will be produced at the AND gate output and this is unlikely to occur.

The optical pulses provided by laser 11 always pass, in part, through half-mirror 17 and are transmitted outside the torpedo via optical window or lens 23. If torpedo 13 is still in the torpedo tube, light 21 will be reflected off the torpedo tube wall and, after being reflected by half-mirror 17, will be split into two beams 45 and 47 by the action of optical lens 49. Photodetectors 51 and 53 will provide electrical outputs at leads 55 and 57, respectively, indicative of detection of the beams 45 and 47. The use of OR gate 71 provides an electrical output at lead 73 upon occurrence of an electrical signal at lead 55 or at lead 57. The signals occurring at lead 73, responsive to the occurrence of a signal at either lead 55 or lead 57, is fed into a NOT gate 75. Thus, a signal will be provided at lead 77 only when no electrical output is available at lead 55 or 57. More particularly, as long as a pulse of light is reflected off torpedo launching tube 25, no output will be available at lead 77. However, upon clearance of the torpedo from its launching tube no light will be detected by photodetectors 51 or 53, no electrical signal will appear at lead 73, and, due to the action of NOT gate 75, only then will an electrical signal appear at lead 77.

The electrical signal occurring at lead 69, responsive to proper operation of the optical system, and the electrical signal occurring at lead 77, indicative of clearance of the torpedo from the torpedo tube, are fed into AND gate 79 and integrated in integrator 83 to provide a signal at terminal 85 which may be utilized to arm the torpedo or the like after separation. Thus, it is apparent, that the torpedo will only be armed upon proper operation of the laser system and clearance of the torpedo from the torpedo tube.

The torpedo separation sensing device according to the present invention provides a system that is both reliable and safe in that failure of a particular component will not cause an output to appear at terminal 85 and, therefore, will not provide a false indication of torpedo clearance. Furthermore, the system is immune to "spoofing" which might occur if an outside source of light, such as a flash light or the like, is received inside the torpedo casing through optical window 23 from the outside environment. Thus, even if photodetectors 37, 39, 51 and 53 detect this light source to provide electrical output at leads 41, 43, 55 and 57, respectively, no arming signals will be available at terminal 85 to prematurely arm the torpedo. The electrical output at either lead 55 or 57 will provide an electrical output at lead 73 which, responsive to NOT gate 75, will cause the absence of an elecrical input at lead 77 and thus no output at lead 81 will be available due to the action of AND gate 79 which requires signals at both inputs for a corresponding output. Furthermore, an electrical output can occur at lead 69 only upon optical detection by both photodetectors 37 and 39 coupled with the proper signal occurring at lead 65. Thus, an electrical output will be provided at lead 69 only upon a proper operation of pulser 15 and, therefore, a "spoofing" signal will not affect premature arming of the torpedo since no signal will be available at lead 69 or lead 77.

Often, however, a spurious signal in a form of noise or like may trigger the photodetectors to provide a false output at their respective lead. It is to be noted, however, that a spurious output at lead 55 or lead 57 caused by the false triggering of photodetectors 51 and 53, respectively, will not affect premature arming of the torpedo since a false signal at 73 will be responsive to gate 75 and no signal will be provided at lead 77.

Similarly, false triggering of photodetector 37 or 39, absent the proper pulse provided by pulser 15 as heretofore explained, will not provide an output at lead 69 due to the lack of corresponding input at lead 65. Assuming that pulser 15 is operating properly but laser 11 is for some reason inoperable, a spurious signal will not provide an output at lead 61 since it is unlikely that a spurious signal will trigger, simultaneously, both photodetectors 37 and 39. Thus, the use of AND gate 59 insures that spurious signals will not provide an output at lead 61.

Thus, it is readily apparent, that the torpedo sensing system of the present invention provides a system which is both safe and reliable and unaffected by various individual component failures such as spurious signals, "spoofing," or optical failure or the like.

Obviously, numerous modifications and variations of the present invention are possible in light of the above teachings. It is therefore to be understood that within the scope of the appended claims, the invention may be practiced otherwise then as specifically described herein.

What is claimed as new and desired to be secured by Letters Patent of the United States is:

1. A torpedo separation sensing device comprising
means for providing a source of optical energy,
means responsive to said source of optical energy for transmitting part of said optical energy within said torpedo and for transmitting part of said optical energy external to said torpedo, means for providing a first electrical signal responsive to said optical energy transmitted within said torpedo, means for providing a second electrical signal responsive to the reflection of said externally transmitted optical energy, and means for providing an electrical signal indicative of torpedo separation in the presence of said first electrical signal and in the absence of said second electrical signal.

2. A torpedo separation sensing device according to claim 1 wherein said means for providing a source of optical energy is a laser located within said torpedo.

3. A torpedo separation sensing device according to claim 1 wherein said means for transmitting part of said optical energy within said torpedo and for transmitting part of said optical energy external to said torpedo is a half-mirror.

4. A torpedo separation sensing device according to claim 1 wherein said means for providing a first electrical signal includes at least one photodetector for detecting said optical energy transmitted within said torpedo and for providing a signal responsive to said detection and further includes means for providing an electrical signal responsive to the modulation of said laser.

5. A torpedo separation sensing device according to claim 4 wherein said means for providing a first electrical signal further comprises means for providing said first electrical signal upon coincidence of said signal responsive to said detection in said photodetector and said electrical signal responsive to the modulation of said laser.

6. A torpedo separation sensing device according to claim 5 wherein said means for providing said first electrical signal further includes a plurality of photodetectors for detecting optical energy transmitted within said torpedo wherein said electrical signal responsive to said detection occurs only upon coincidence of detection of said photodetectors.

7. A torpedo separation sensing device according to claim 1 wherein said means for providing said second electrical signal includes at least one photodetector for detecting the reflection of said externally transmitted optical signal back in said torpedo.

8. A torpedo separation sensing device according to claim 7 wherein said means for providing said second electrical signal further includes means for providing said second electrical signal upon absence of detection by said photodetector.

9. A torpedo separation sensing device according to claim 1 wherein said means for providing a second electrical signal includes a plurality of photodetectors for detecting the reflection of said externally transmitted optical signal back in said torpedo and for providing an electrical output responsive to the detection of one of said photodetectors, and means for providing said second electrical signal upon absence of detection by any of said photodetectors.

\* \* \* \* \*